United States Patent
Arita

(10) Patent No.: US 10,481,596 B2
(45) Date of Patent: Nov. 19, 2019

(54) CONTROL DEVICE AND CONTROL SYSTEM

(71) Applicant: FANUC CORPORATION, Yamanashi (JP)

(72) Inventor: Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 317 days.

(21) Appl. No.: 15/664,213

(22) Filed: Jul. 31, 2017

(65) Prior Publication Data

US 2018/0039260 A1 Feb. 8, 2018

(30) Foreign Application Priority Data

Aug. 8, 2016 (JP) .................. 2016-155753

(51) Int. Cl.
*G05B 23/02* (2006.01)
*G05B 19/418* (2006.01)

(52) U.S. Cl.
CPC ..... *G05B 23/0221* (2013.01); *G05B 19/4185* (2013.01); *G05B 2219/25022* (2013.01)

(58) Field of Classification Search
None
See application file for complete search history.

(56) References Cited

U.S. PATENT DOCUMENTS

| | | |
|---|---|---|
| 4,968,098 A | 11/1990 | Hirsch et al. |
| 2008/0215292 A1 | 9/2008 | Kato et al. |
| 2008/0309366 A1 | 12/2008 | Zhou et al. |
| 2009/0146599 A1 | 6/2009 | Zhou et al. |
| 2012/0010748 A1 | 1/2012 | Sasai |
| 2012/0065902 A1 | 3/2012 | Nakajima |
| 2012/0179294 A1* | 7/2012 | Sasai ............... B25J 9/1694 700/254 |
| 2012/0224240 A1 | 9/2012 | Aimono et al. |
| 2013/0178739 A1 | 7/2013 | Hamilton, Jr. |
| 2014/0121503 A1 | 5/2014 | Hamilton, Jr. |
| 2014/0121832 A1 | 5/2014 | Sasai |
| 2014/0257714 A1 | 9/2014 | Kiviniemi et al. |
| 2015/0045942 A1 | 2/2015 | Koyama |

(Continued)

FOREIGN PATENT DOCUMENTS

| | | |
|---|---|---|
| CN | 101762746 A | 6/2010 |
| CN | 102341720 A | 2/2012 |

(Continued)

OTHER PUBLICATIONS

S. B. Nickerson1, P. Jasiobedzki4, D. Wilkes1; M. Jenkin3, E. Milios, J. Tsotsos, An autonomous mobile robot for known industrial environments , 1997 (Year: 1997).*

(Continued)

*Primary Examiner* — Roy Y Yi

(74) *Attorney, Agent, or Firm* — Karceski IP Law, PLLC

(57) ABSTRACT

A control device includes a receiving unit that receives output signals from a plurality of manufacturing machines, via a communication network; a noise-component extracting unit that extracts a common noise component that is contained in the output signals; and a noise-component removing unit that removes the extracted noise component from at least one of the output signals.

6 Claims, 11 Drawing Sheets

(56) References Cited

U.S. PATENT DOCUMENTS

| | | |
|---|---|---|
| 2015/0223775 A1 | 8/2015 | Hamilton, Jr. |
| 2016/0279795 A1 | 9/2016 | Sasai |
| 2018/0154529 A1 | 6/2018 | Shimizu et al. |

FOREIGN PATENT DOCUMENTS

| | | |
|---|---|---|
| CN | 102654643 A | 9/2012 |
| CN | 103857995 A | 6/2014 |
| CN | 106217130 A | 12/2016 |
| EP | 1882922 A2 | 1/2008 |
| EP | 2495600 A1 | 9/2012 |
| EP | 2581724 A1 | 4/2013 |
| EP | 2662190 A1 | 11/2013 |
| JP | 05-052712 | 3/1993 |
| JP | 2004094356 A | 3/2004 |
| JP | 2004165282 A | 6/2004 |
| JP | 2004-202624 | 7/2004 |
| JP | 2005284519 A | 10/2005 |
| JP | 2008032477 A | 2/2008 |
| JP | 2010257207 A | 11/2010 |
| JP | 2011110630 A | 6/2011 |
| JP | 2012020343 A | 2/2012 |
| JP | 2012063164 A | 3/2012 |
| JP | 2012139807 A | 7/2012 |
| JP | 2015037086 A | 2/2015 |
| KR | 101528090 B1 | 6/2015 |
| WO | 2010079415 A2 | 7/2010 |
| WO | 2016185593 A1 | 11/2016 |

OTHER PUBLICATIONS

John Mullane, Martin D. Adams, Wijerupage Sardha Wijesoma, Robotic Mapping Using Measurement Likelihood Filtering, The International Journal of Robotics Research vol. 28 No. 2 pp. 172-190 (Year: 2009).*

Japanese Search Report from Registered Searching Authority dated Jul. 18, 2018, for Japanese Patent Application No. 2016-155753, forwarded with the Japanese Office Action dated Jul. 31, 2018.

Japanese Office Action dated Jul. 31, 2018, for Japanese Patent Application No. 2016-155753.

Chinese Office Action dated Jul. 1, 2019, for Chinese Patent Application No. 201710656884.X.

* cited by examiner

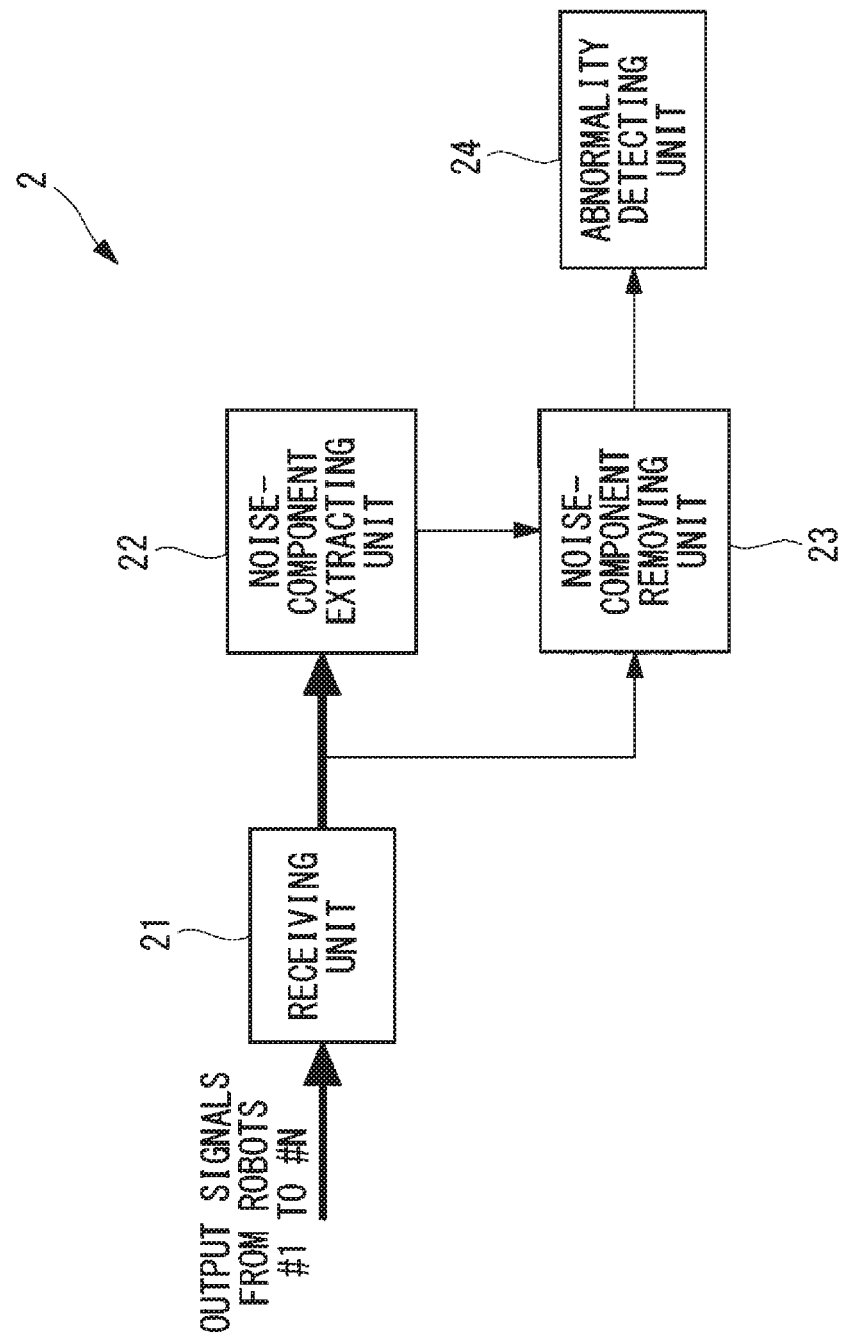

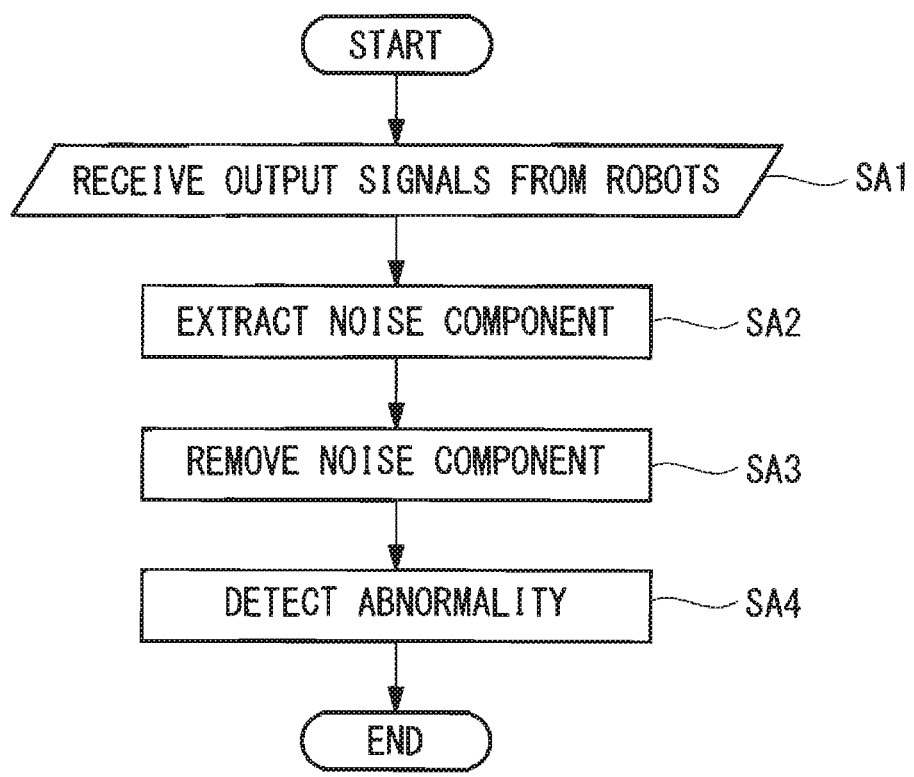

CONTROL DEVICE AND CONTROL SYSTEM

CROSS-REFERENCE TO RELATED APPLICATIONS

This application is based on and claims priority to Japanese Patent Application No. 2016-155753, filed on Aug. 8, 2016, the entire content of which is incorporated herein by reference.

FIELD OF THE INVENTION

The present invention relates to a control device and a control system suitable for controlling a plurality of manufacturing machines connected via a communication network.

BACKGROUND OF THE INVENTION

There are conventionally known devices that collect information from a plurality of robots connected to a communication network, thereby predicting a failure in the robots (for example, see Japanese Unexamined Patent Application, Publication No. 2004-202624). Furthermore, there are known devices that predict a failure by using information from a vibration sensor that is provided at a working end of a robot (for example, see Japanese Unexamined Patent Application, Publication No. Hei 05-52712).

As in such a device, in a case in which information is collected from a robot or from a sensor provided on a robot, such information often contains environmental-factor noise, such as noise due to vibrations from a forklift passing near the device, fluctuations in the power-supply voltage, or a processing machine, for example. In general, in order to remove such environmental-factor noise, a filter is applied to a signal containing the information from the sensor.

SUMMARY OF THE INVENTION

According to a first aspect, the present invention provides a control device including: a receiving unit that receives output signals output from a plurality of manufacturing machines, via a communication network; a noise-component extracting unit that extracts a common noise component contained in the received output signals; and a noise-component removing unit that removes the extracted noise component from at least one of the output signals.

According to a second aspect, the present invention provides a control system including: one of the above-described control devices; and the plurality of manufacturing machines connected to the control device via the communication network.

BRIEF DESCRIPTION OF THE DRAWINGS

FIG. 2 is a block diagram showing, in outline, the configuration of a control device according to a first embodiment of the present invention.

FIG. 9 is a flowchart showing processing performed in the control device according to the first embodiment of the present invention.

DESCRIPTION OF EMBODIMENTS

First Embodiment

A control system according to a first embodiment of the present invention will be described in detail below with reference to the drawings.

Figure 1:
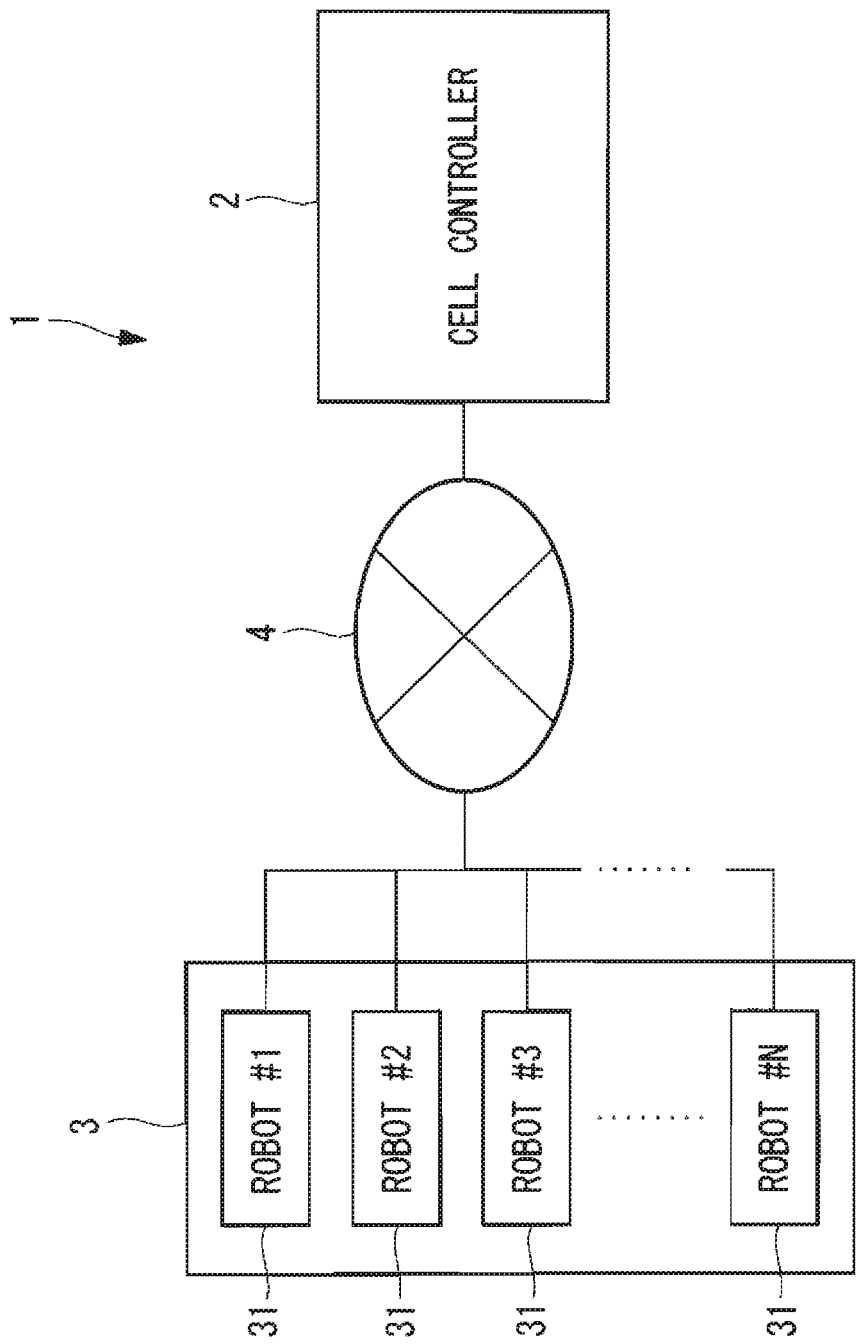
FIG. 1 is a block diagram showing, in outline, the configuration of a control system according to one embodiment of the present invention.

As shown in FIG. 1, a control system 1 of this embodiment is provided with: a manufacturing cell 3 that includes a plurality of robots 31 indicated by robot #1 to robot #N; a cell controller 2 that serves as a control device for controlling the plurality of robots 31 included in the manufacturing cell 3; and a communication network 4 that connects the cell controller 2 and the manufacturing cell 3.

According to the control system 1, various signals output from robot #1 to robot #N are sent to the cell controller 2 via the communication network 4, and, in the cell controller 2, the states of robot #1 to robot #N, such as a failure or an abnormality, are detected or predicted on the basis of the various signals.

Note that, in this embodiment, although the manufacturing cell 3 is configured to include the plurality of robots 31, the configuration thereof is not limited thereto, and the manufacturing cell 3 may be configured to include manufacturing machines, such as industrial machines.

Furthermore, in this embodiment, although the manufacturing cell 3 includes N (N>3) robots for convenience of explanation, the present invention can be actually implemented if at least two manufacturing machines, such as industrial machines, robots, etc., are included.

Furthermore, in this embodiment, although the cell controller 2, which controls the robots included in the manufacturing cell 3, is illustrated as an example control device, the control device is not limited thereto and may be, instead of the cell controller 2, a controller that is installed in an upper layer in the network.

The configuration of the cell controller 2, which is provided in the control system 1, will be described in detail below with reference to the drawings. Note that the cell controller 2 is provided with a processor (not shown), and this processor is configured to perform processing in respective functional blocks shown in FIG. 2.

As shown in FIG. 2, the cell controller 2 is provided with, as functional blocks, a receiving unit 21, a noise-component extracting unit 22, and a noise-component removing unit 23. Furthermore, the cell controller 2 is provided with an abnormality detecting unit 24, in addition to the receiving unit 21, the noise-component extracting unit 22, and the noise-component removing unit 23.

The receiving unit 21 is connected to the plurality of robots 31 via the communication network 4. Furthermore, the receiving unit 21 is connected to the noise-component extracting unit 22 and the noise-component removing unit 23. The noise-component extracting unit 22 is connected to the noise-component removing unit 23. The noise-component removing unit 23 is connected to the abnormality detecting unit 24.

The receiving unit 21 is configured to receive output signals from the robots 31 indicated by robot #1 to robot #N, via the communication network 4. The receiving unit 21 may receive output signals from all of the robots 31 included in the manufacturing cell 3 or may receive output signals from at least two desired robots 31. In this embodiment, the receiving unit 21 receives output signals from three robots 31 indicated by robot #1 to robot #3.

Figure 3A:
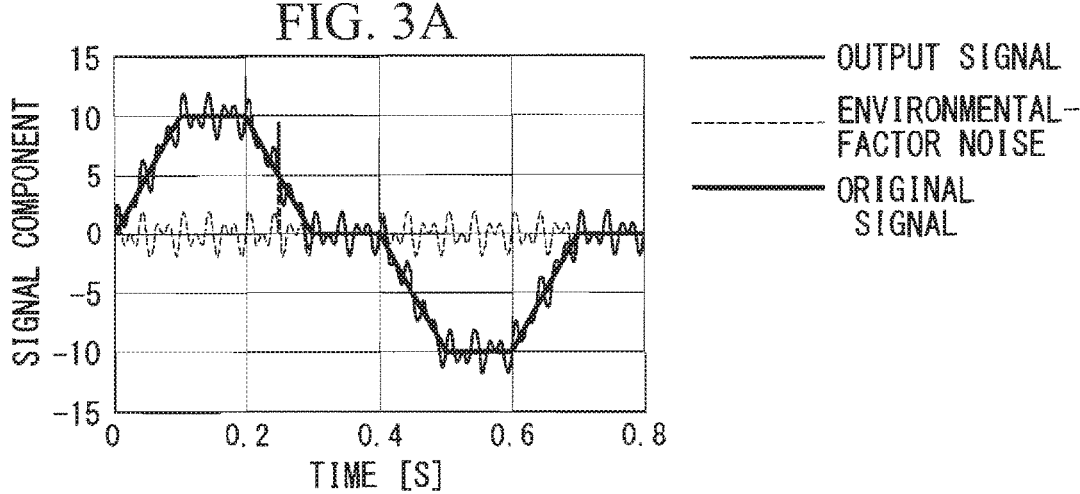
FIG. 3A is a view showing an example of output signal from a robot, environmental-factor noise, and original signal.

A signal output from the robot 31 indicated by robot #1 is, for example, a signal indicated by a thin solid line in FIG. 3A that is obtained by superimposing environmental-factor noise indicated by a dashed line in FIG. 3A on the original signal indicated by a thick solid line in FIG. 3A.

Figure 3B:
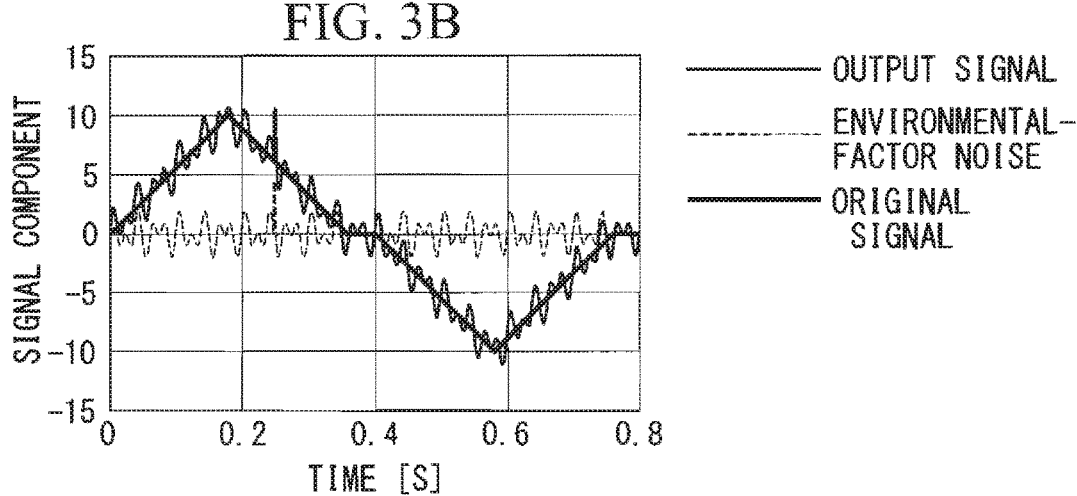
FIG. 3B is a view showing an example of output signal from a robot, environmental-factor noise, and original signal.

A signal output from the robot 31 indicated by robot #2 is, for example, a signal indicated by a thin solid line in FIG. 3B that is obtained by superimposing environmental-factor noise indicated by a dashed line in FIG. 3B on the original signal indicated by a thick solid line in FIG. 3B.

Figure 3C:
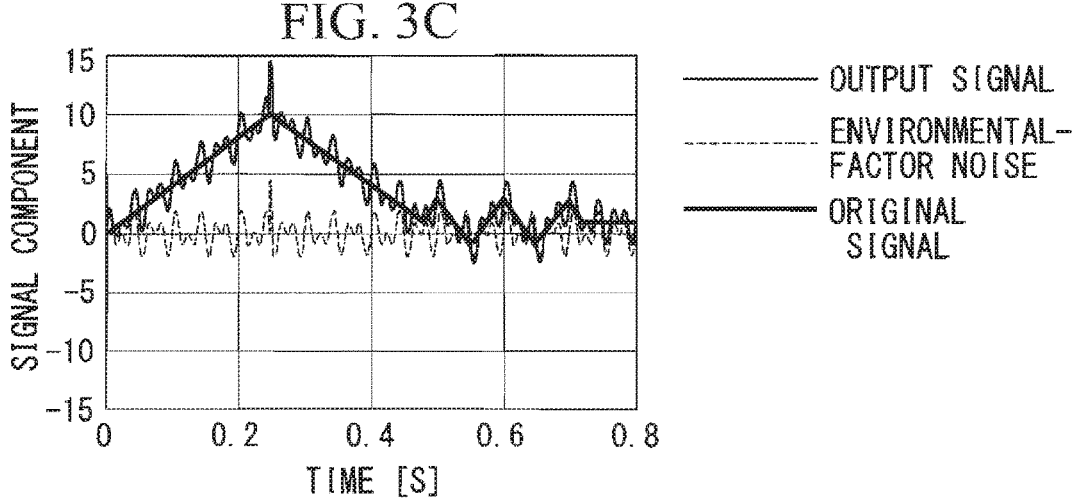
FIG. 3C is a view showing an example of output signal from a robot, environmental-factor noise, and original signal.

A signal output from the robot 31 indicated by robot #3 is, for example, a signal indicated by a thin solid line in FIG. 3C that is obtained by superimposing environmental-factor noise indicated by a dashed line in FIG. 3C on the original signal indicated by a thick solid line in FIG. 3C.

Furthermore, the signal output from each robot 31 is, for example, an output value of an encoder that is provided in the robot 31 or a current command value for a motor that is provided in the robot 31.

The noise-component extracting unit 22 is configured to extract, on the basis of the output signals from the plurality of robots 31 received by the receiving unit 21, a common noise component that is contained in the respective output signals.

Figure 4A:
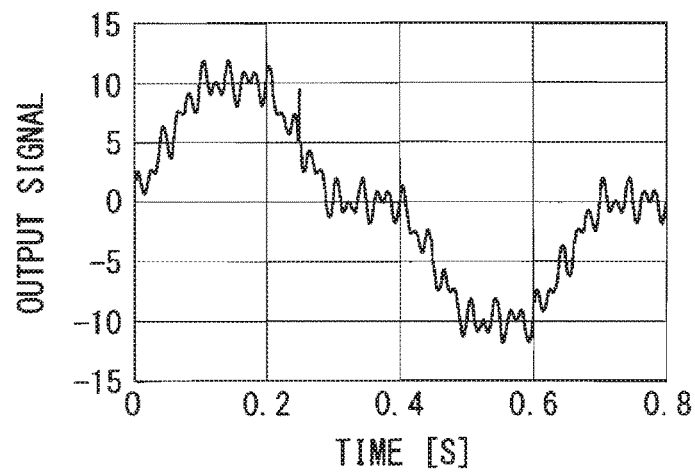
FIG. 4A is a view showing the output signal shown in FIG. 3A.
Figure 4B:
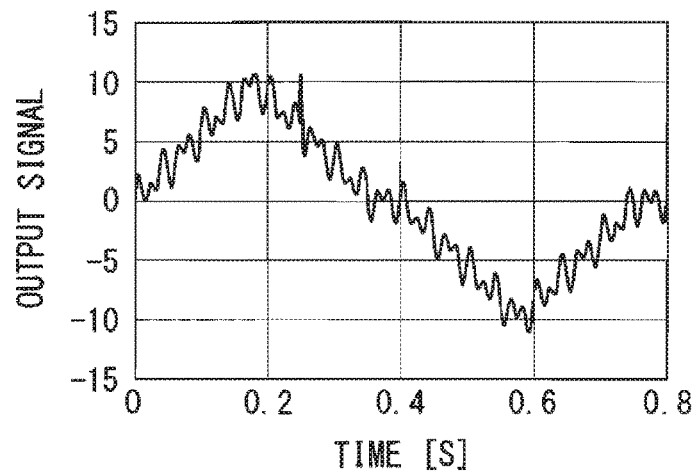
FIG. 4B is a view showing the output signal shown in FIG. 3B.
Figure 4C:
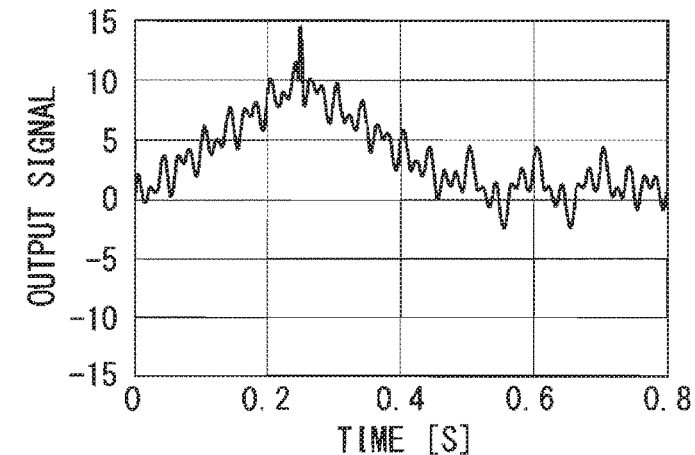
FIG. 4C is a view showing the output signal shown in FIG. 3C.
Figure 5A:
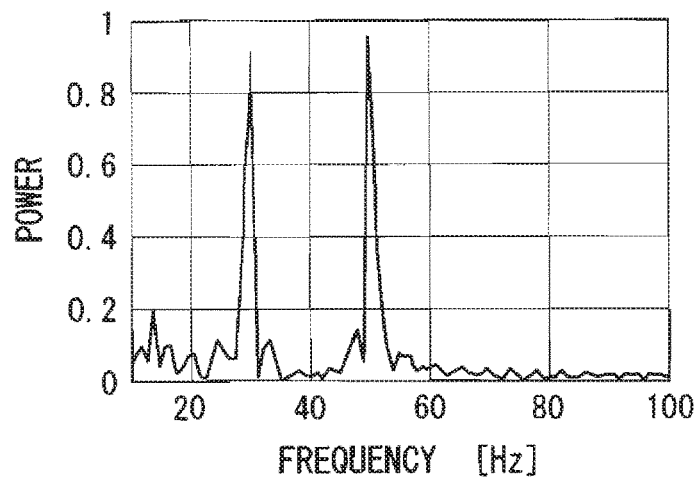
FIG. 5A is a view showing frequency spectrum of the output signal shown in FIG. 4A.
Figure 5B:
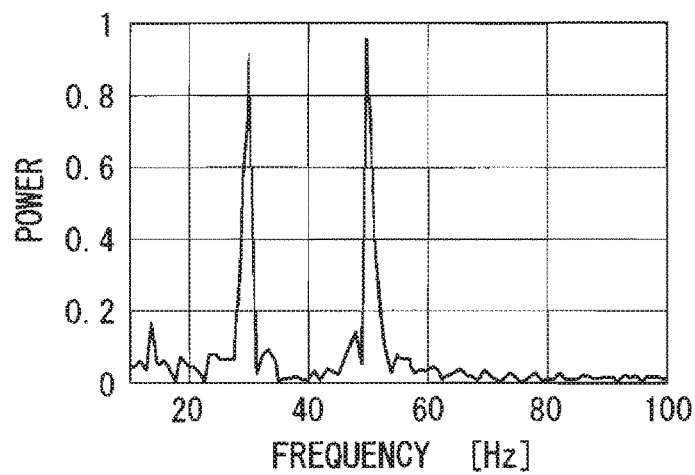
FIG. 5B is a view showing frequency spectrum of the output signal shown in FIG. 4B.
Figure 5C:
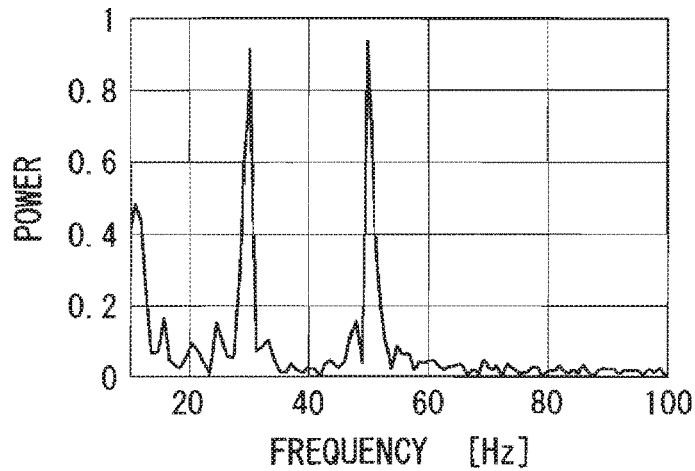
FIG. 5C is a view showing frequency spectrum of the output signal shown in FIG. 4C.
Figure 6:
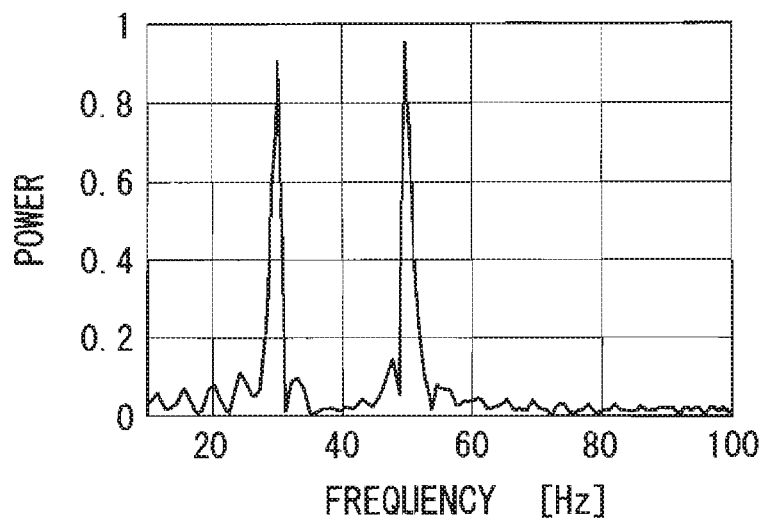
FIG. 6 is a view showing a frequency spectrum obtained by extracting common power from the frequency spectra shown in FIGS. 5A, 5B, and 5C.
Figure 7:
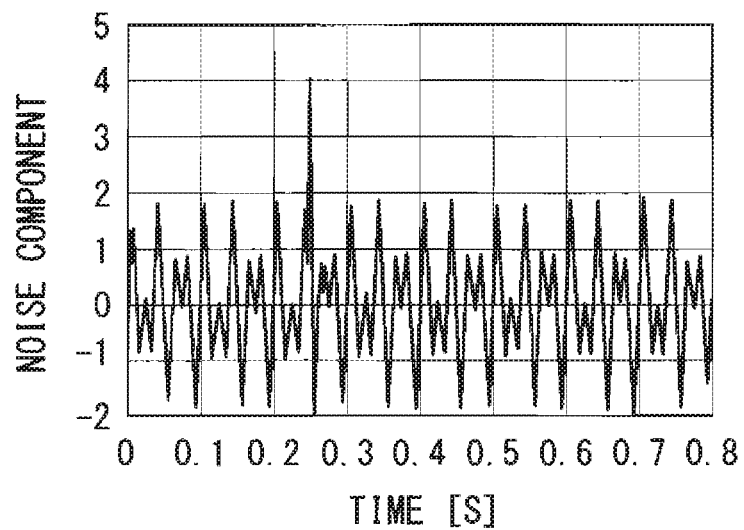
FIG. 7 is a waveform diagram showing, in the time domain, the frequency spectrum shown in FIG. 6.

More specifically, the noise-component extracting unit 22 applies a Fourier transform to output signals (FIGS. 4A to 4C) from the robots 31 indicated by robot #1 to robot #3, thereby calculating frequency spectra corresponding to the respective output signals, as shown in FIGS. 5A to 5C. Furthermore, the noise-component extracting unit 22 extracts, at each frequency, power that is common to the frequency spectra shown in FIGS. 5A to 5C. In other words, among the plurality of frequency spectra, power of the frequency spectrum that has the minimum value is selected at each frequency, thereby generating a common-power spectrum as shown in FIG. 6. Then, the noise-component extracting unit 22 applies a high-pass filter to the common-power spectrum, thus removing low-frequency components contained in the original signals themselves, and then applies an inverse Fourier transform thereto, thereby extracting a noise component as shown in FIG. 7.

Note that the cutoff frequency of the high-pass filter is about 10 Hz to 15 Hz, for example.

Figure 8A:
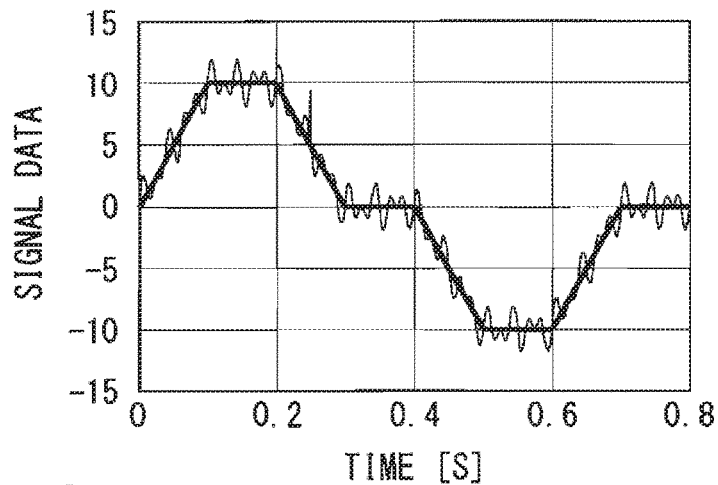
FIG. 8A is a view showing the output signal shown in FIG. 4A and signal from which a noise component has been removed.
Figure 8B:
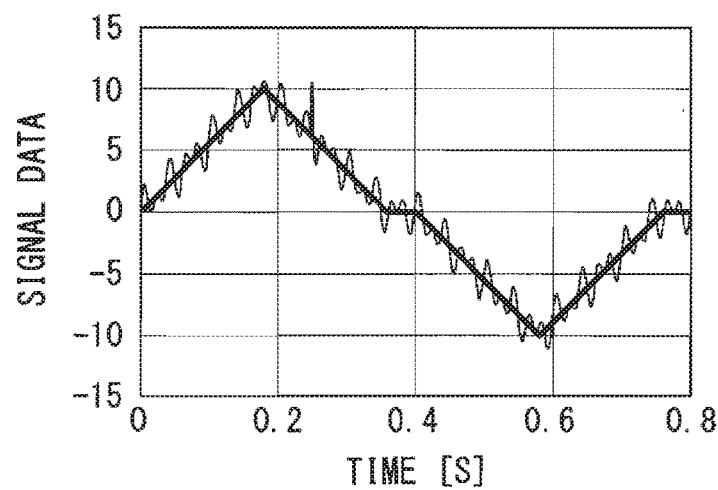
FIG. 8B is a view showing the output signal shown in FIG. 4B and signal from which a noise component has been removed.
Figure 8C:
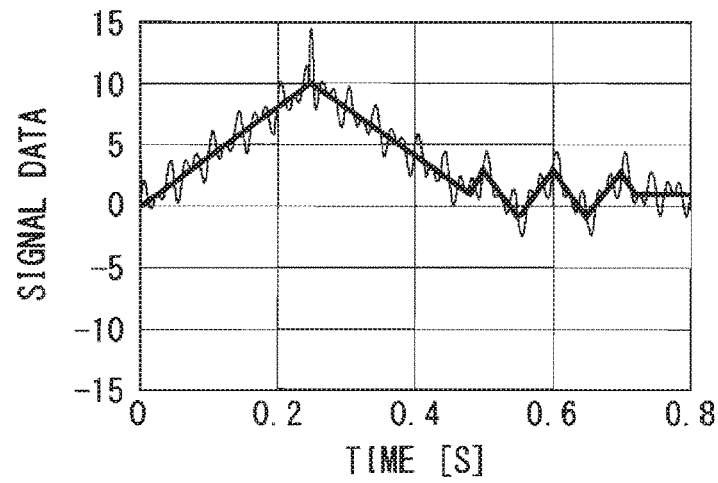
FIG. 8C is a view showing the output signal shown in FIG. 4C and signal from which a noise component has been removed.

The noise-component removing unit 23 is configured to take the difference between the noise component extracted by the noise-component extracting unit 22 and at least one signal, among the output signals from the plurality of robots 31 received by the receiving unit, thereby removing the noise component. The signals obtained after the noise component is removed are indicated by the thick solid lines in FIGS. 8A to 8C.

Note that the removal of a noise component performed in the noise-component removing unit 23 may be applied only to the output signal from a robot 31 that serves as an abnormality detection target in the next abnormality detecting unit 24.

The abnormality detecting unit 24 is configured to detect an abnormality or a failure in the robot 31 on the basis of the signal from which the noise component has been removed in the noise-component removing unit 23.

Specifically, if the signal from which the noise component has been removed exceeds a predetermined threshold that is set in advance, it is determined that an abnormality or a failure has occurred in the robot 31 that has output this signal. Alternatively, it is also possible to detect or predict a current or future abnormality or failure through machine learning.

The operation of the cell controller 2, which has the above-described configuration, will be described below with reference to FIG. 9.

First, the receiving unit 21 receives output signals from the robots 31 indicated by robot #1 to robot #3 (Step SA1 in FIG. 9). Next, a noise component common to the plurality of received output signals is extracted (Step SA2 in FIG. 9). Then, the extracted noise component is removed from the output signal of the robot 31 that is an abnormality detection target (Step SA3 in FIG. 9). Then, abnormality detection is performed for the robot 31 by using the signal from which the noise component has been removed (Step SA4 in FIG. 9).

In this way, because the environmental-factor noise component common to the output signals of the plurality of robots 31 is identified, and abnormality detection is performed on the basis of the signal from which the noise component has been removed, the robots 31 can be controlled with high accuracy without being affected by an environmental-factor disturbance.

Second Embodiment

A control system according to a second embodiment of the present invention will be described below.

The control system of this embodiment differs in configuration from that of the first embodiment in that a cell controller 5 is provided instead of the cell controller 2, which is provided in the control system 1 of the first embodiment shown in FIG. 1. Specifically, the control system of this embodiment is provided with: the manufacturing cell 3, which includes the plurality of robots 31 indicated by robot #1 to robot #N; the cell controller 5, which is a control device that controls the plurality of robots 31 included in the manufacturing cell 3; and the communication network 4, which connects the cell controller 5 and the manufacturing cell 3.

According to the control system of this embodiment, various signals output from robot #1 to robot #N are sent to the cell controller 5 via the communication network 4, and, in the cell controller 5, the states of robot #1 to robot #N, such as a failure or an abnormality, are detected or predicted on the basis of the various signals.

Note that, in this embodiment, although the manufacturing cell 3 is configured to include a plurality of robots 31, the configuration thereof is not limited thereto, and the manufacturing cell 3 may be configured to include manufacturing machines, such as industrial machines.

Furthermore, in this embodiment, although the manufacturing cell 3 includes N (N>3) robots for convenience of explanation, the present invention can be actually implemented if at least two manufacturing machines, such as industrial machines, robots, etc., are included.

Furthermore, in this embodiment, although the cell controller 5, which controls the robots included in the manufacturing cell 3, is illustrated as an example control device, the control device is not limited thereto and may be, instead of the cell controller 5, a controller that is installed in an upper layer in the network.

The configuration of the cell controller 5 will be described in detail below with reference to the drawings. Note that the cell controller 5 is provided with a processor (not shown), and this processor is configured to perform processing in respective functional blocks shown in FIG. 10. In the following description, identical reference signs are assigned to portions having configurations common to those in the cell controller 2 provided in the control system 1 of the first embodiment, and a description thereof will be omitted.

Figure 10:
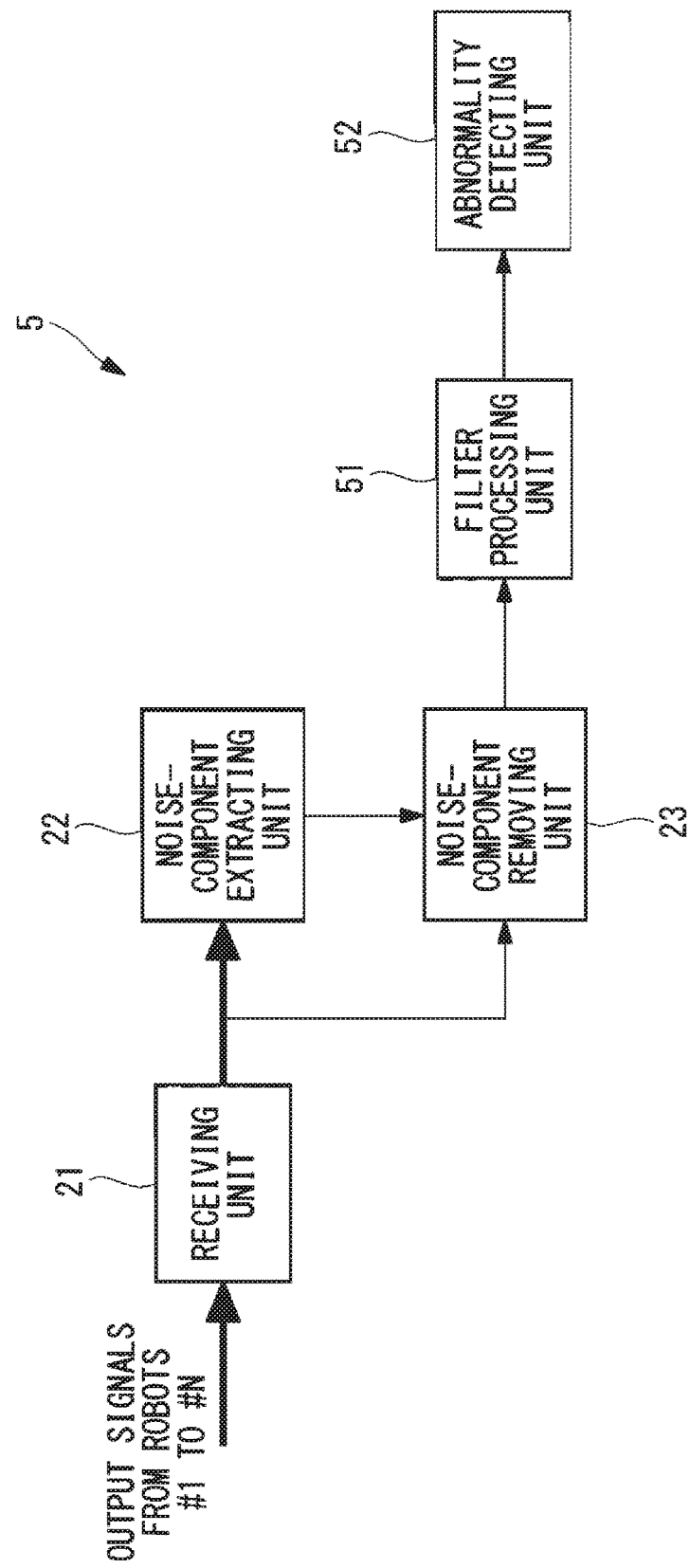
FIG. 10 is a block diagram showing, in outline, the configuration of a control device according to a second embodiment of the present invention.

As shown in FIG. 10, as in the cell controller 2 of the first embodiment, the cell controller 5 is provided with, as functional blocks, the receiving unit 21, the noise-component extracting unit 22, and the noise-component removing unit 23. Furthermore, the cell controller 5 is provided with a filter processing unit 51 and an abnormality detecting unit 52, in addition to the receiving unit 21, the noise-component extracting unit 22, and the noise-component removing unit 23.

The receiving unit 21 is connected to the plurality of robots 31 via the communication network 4. Furthermore, the receiving unit 21 is connected to the noise-component extracting unit 22 and the noise-component removing unit 23. The noise-component extracting unit 22 is connected to the noise-component removing unit 23. The noise-component removing unit 23 is connected to the filter processing unit 51. The filter processing unit 51 is connected to the abnormality detecting unit 52.

The filter processing unit 51 is configured to apply a filter to the signal from which the noise component has been removed in the noise-component removing unit 23. Filter processing in the filter processing unit 51 is applied so as to obtain a signal suitable for being subjected to abnormality detection in the abnormality detecting unit 52.

The abnormality detecting unit 52 is configured to detect an abnormality or a failure in the robot 31 on the basis of the signal to which the filter processing has been applied in the filter processing unit 51.

Specifically, if the signal to which the filter processing has been applied exceeds a predetermined threshold that is set in advance, it is determined that an abnormality or a failure has occurred in the robot 31 that has output this signal. Alternatively, it is also possible to detect or predict a current or future abnormality or failure through machine learning.

The operation of the cell controller 5, which has the above-described configuration, will be described below with reference to FIG. 11.

Figure 11:
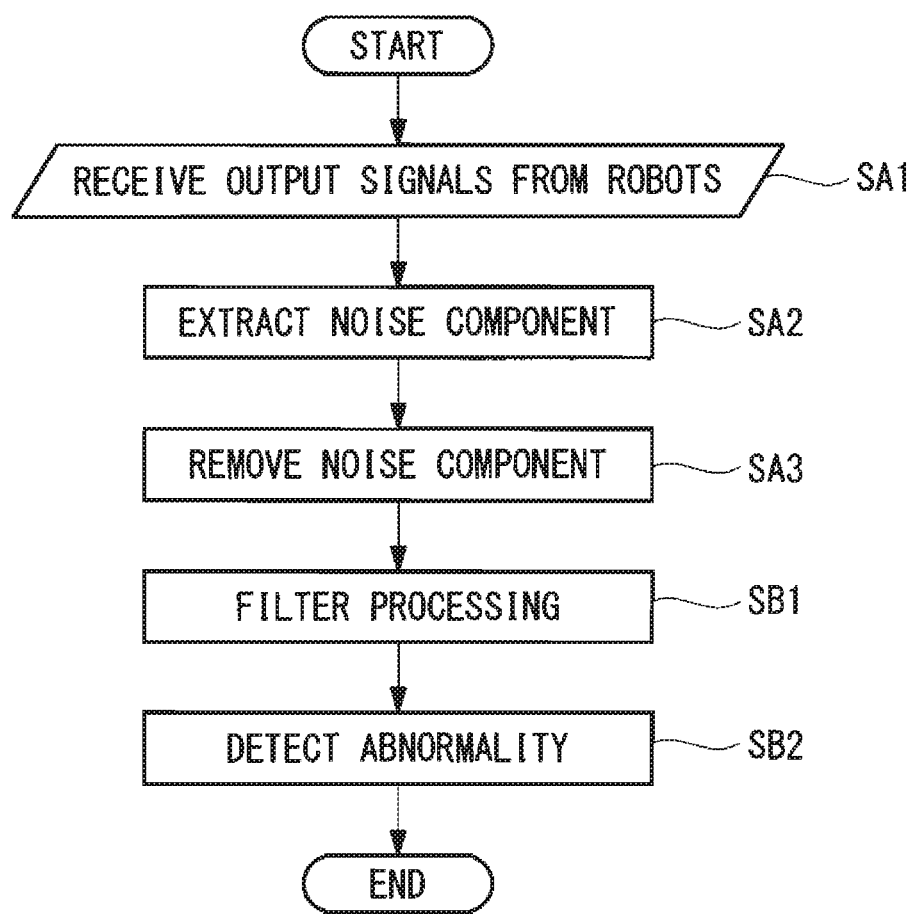
FIG. 11 is a flowchart showing processing performed in the control device according to the second embodiment of the present invention.

A filter is applied to the signal from which the noise component has been removed, as in the first embodiment, in the filter processing unit 51, thus generating a signal suitable for being subjected to abnormality detection (Step SB1 in FIG. 11).

For example, when only a signal at a specific frequency in the signal from which the noise component has been removed is to be cut off, a notch filter can be applied. Furthermore, when high-frequency noise is not completely removed in the signal from which the noise component has been removed, a low-pass filter can be applied. Furthermore, when a low-frequency component, which depends on a posture change or a temperature change of the robot 31, is contained in the signal from which the noise component has been removed, a high-pass filter can be applied.

Then, abnormality detection for the robot 31 is performed by using the signal generated in the filter processing unit 51 (Step SB2 in FIG. 11).

In this way, because the environmental-factor noise component common to the output signals of the plurality of robots 31 is identified, and abnormality detection is performed on the basis of the signal from which this noise component has been removed, the robots 31 can be controlled with high accuracy without being affected by an environmental-factor disturbance.

Although the embodiments of the present invention have been described above in detail with reference to the drawings, the specific configurations are not limited to the embodiments, and design changes etc. that do not depart from the scope of the present invention are also encompassed.

Figure 12:
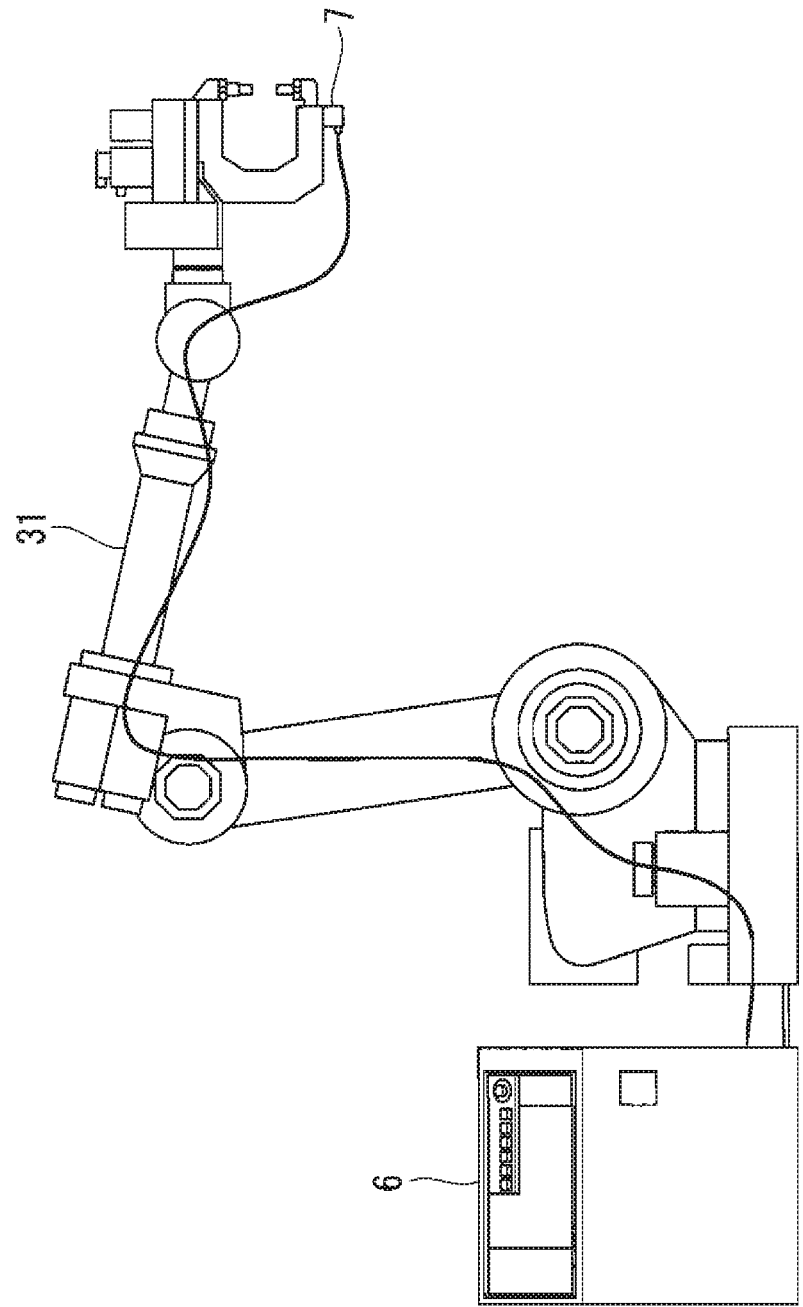
FIG. 12 is a view showing an example robot arm to which an external sensor is attached.

For example, in the above-described embodiments, although an output signal from each robot 31 is an output from a device, such as an encoder, provided in the robot 31, as shown in FIG. 12, it is also possible to use an output value from an external sensor 7, such as a vibration sensor or an acceleration sensor, provided on the robot 31. In this case, the output from the external sensor 7 may be sent to the cell controller 2 or 5 via a machine control device 6, as shown in FIG. 12, or may be directly sent to the cell controller 2 or 5.

Furthermore, for example, the above-described cell controller 2 or 5 may be provided with, instead of the abnormality detecting unit 24 or 52, a control-command generating unit that generates a control command for the robot 31 on the basis of the signal from which noise has been removed.

As a result, the above-described embodiments lead to the following aspects.

According to a first aspect, the present invention provides a control device including: a receiving unit that receives output signals output from a plurality of manufacturing machines, via a communication network; a noise-component extracting unit that extracts a common noise component contained in the received output signals; and a noise-component removing unit that removes the extracted noise component from at least one of the output signals.

According to the control device of this aspect, the receiving unit receives signals output from the plurality of manufacturing machines, via the communication network. Then, the noise-component extracting unit extracts a common noise component contained in the received signals. Then, the noise-component removing unit removes, from at least one of the signals received by the receiving unit, the noise extracted by the noise-component extracting unit.

Accordingly, it is possible to remove a common environmental-factor noise component that is superimposed on the signals output from the plurality of manufacturing machines. As a result, it is possible to control each of the manufacturing machines with high accuracy on the basis of the signal from which the noise component has been removed.

The control device according to the above-described first aspect may have a configuration in which an abnormality detecting unit that is configured to detect an abnormality in the plurality of manufacturing machines on the basis of the signal from which the noise component has been removed by the noise-component removing unit is further included.

With this configuration, because an abnormality in each of the manufacturing machines can be detected on the basis of the signal from which the noise component has been removed, each manufacturing machine can be controlled with high accuracy.

The control device according to the above-described first aspect may have a configuration in which a filter processing unit that applies filter processing to the signal from which the noise component has been removed by the noise-component removing unit, and an abnormality detecting unit that is configured to detect an abnormality in the plurality of manufacturing machines on the basis of the signal to which the filter processing has been applied by the filter processing unit are further included.

With this configuration, a desired filter is applied to the signal to be input to the abnormality detecting unit, thereby making it possible to generate a signal suitable for being subjected to abnormality detection.

In the control device according to the above-described first aspect, the output signals may contain outputs from encoders that are respectively provided in the plurality of manufacturing machines or current commands for motors that are respectively provided in the plurality of manufacturing machines.

In the control device according to the above-described first aspect, the output signals may contain outputs from external sensors that are respectively provided on the plurality of manufacturing machines.

According to a second aspect, the present invention provides a control system including: one of the above-described control devices; and the plurality of manufacturing machines connected to the control device via the communication network.

According to the present invention, an advantageous effect is afforded in that a plurality of manufacturing machines can be controlled with high accuracy by identifying and removing environmental-factor noise contained in signals.

The invention claimed is:

1. A control device, comprising:
   a receiving unit that receives output signals from a plurality of manufacturing machines, via a communication network;
   a noise-component extracting unit that extracts a common noise component contained in the output signals; and
   a noise-component removing unit that removes the extracted noise component from at least one of the output signals,
   wherein the noise-component extracting unit extracts the common noise component by selecting, from frequency spectra corresponding to each of the output signals, power that has the minimum value at each frequency to generate a common-power spectrum and applying a high-pass filter to the common-power spectrum.

2. A control device according to claim 1, further comprising an abnormality detecting unit that is configured to detect an abnormality in the plurality of manufacturing machines based on the output signals from which the common noise component has been removed by the noise-component removing unit.

3. A control device according to claim 1, further comprising:
   a filter processing unit that applies filter processing to the output signals from which the extracted noise component has been removed by the noise-component removing unit; and
   an abnormality detecting unit that is configured to detect an abnormality in the plurality of manufacturing machines based on the output signals to which the filter processing has been applied by the filter processing unit.

4. A control device according to claim 1, wherein the output signals contain outputs from encoders that are respectively provided in the plurality of manufacturing machines or current commands for motors that are respectively provided in the plurality of manufacturing machines.

5. A control device according to claim 1, wherein the output signals contain outputs from external sensors that are respectively provided on the plurality of manufacturing machines.

6. A control system comprising:
   a control device according to claim 1; and
   the plurality of manufacturing machines connected to the control device via the communication network.

* * * * *